United States Patent [19]

Olmr

[11] Patent Number: 5,605,033
[45] Date of Patent: Feb. 25, 1997

[54] LAWNMOWING APPARATUS WITH GRASS COLLECTOR FULLNESS DETECTOR

[76] Inventor: Jaroslav J. Olmr, 2919 N. 8th St., Sheboygan, Wis. 53083

[21] Appl. No.: 433,262

[22] Filed: May 2, 1995

[51] Int. Cl.⁶ .................................................. A01D 34/70
[52] U.S. Cl. ...................... 56/10.2 R; 56/10.3; 56/16.6; 56/202
[58] Field of Search ............................ 56/202, 199, 200, 56/203, 16.6, 10.2 R, 10.3

[56] References Cited

U.S. PATENT DOCUMENTS

| | | | |
|---|---|---|---|
| 4,761,943 | 8/1988 | Parker et al. | 56/202 |
| 4,782,650 | 11/1988 | Walker | 56/202 |
| 4,964,266 | 10/1990 | Kolb | 56/202 |
| 4,981,011 | 1/1991 | Olejak | 56/10.2 R |
| 5,321,939 | 6/1994 | Fuse et al. | 56/202 X |
| 5,325,650 | 7/1994 | Fuse et al. | 56/10.2 |
| 5,361,568 | 11/1994 | Lin | 56/202 X |
| 5,388,394 | 2/1995 | Heismann | 56/194 |

FOREIGN PATENT DOCUMENTS 2101864  1/1983  United Kingdom .

*Primary Examiner*—Terry Lee Melius
*Assistant Examiner*—Heather Shackelford
*Attorney, Agent, or Firm*—Burns, Doane, Swecker & Mathis, L.L.P.

[57] ABSTRACT

A fullness detector for the grass collector of a lawnmower includes a pressure actuated switch which is responsive to a pressure condition in an air flow passage for conveying grass cuttings between the lawnmower and the collector. Preferably the condition is the static pressure within the passage, which is sensed in a sensing zone shielded by a baffle. The baffle serves to increase the difference in static pressure measured in the zone between any two conditions of fullness of the collector, and to reduce grass build-up in the zone. The signal for the detector may be used to control a function of the lawnmower.

16 Claims, 2 Drawing Sheets

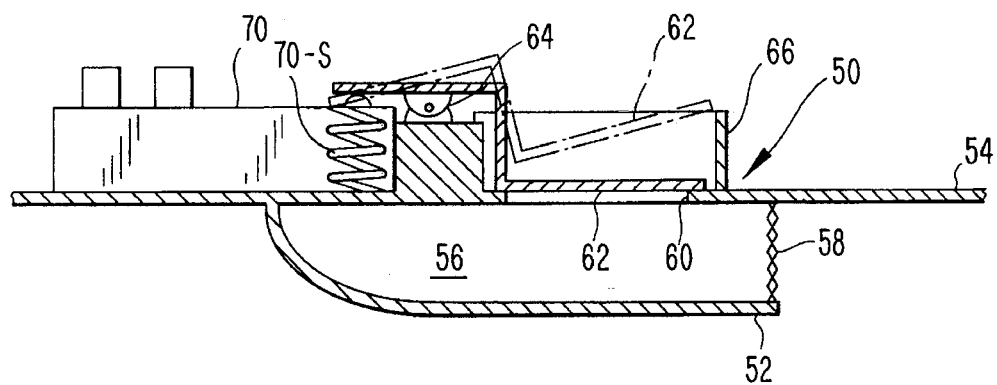
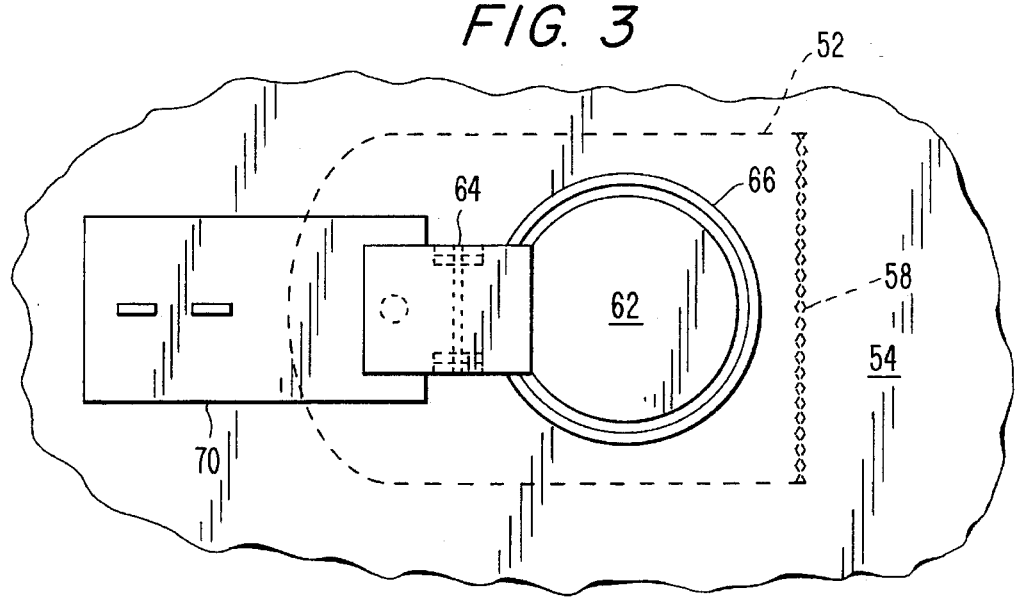
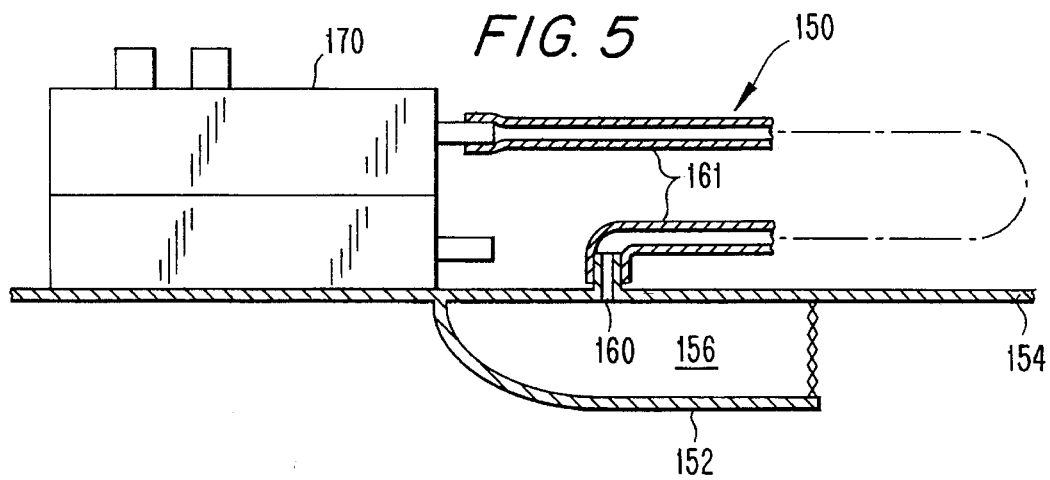

LAWNMOWING APPARATUS WITH GRASS COLLECTOR FULLNESS DETECTOR

FIELD OF INVENTION

This invention relates to power driven lawnmowers. It is particularly described in relation to a garden tractor lawnmower, but it is not necessarily restricted thereto.

BACKGROUND OF INVENTION

Power lawnmowers of the rotary blade type include a housing within which at least one cutting blade is mounted for rotation. Commonly, a grass collector is provided, and a chute connects the housing to the collector; typically for a garden tractor arrangement, the chute may have a length of about one meter, and in the event that the collector is not emptied when full, the chute becomes blocked and is difficult to clear.

Various proposals have been made for the provision of indicators for the fullness of the collector. Thus, in accordance with one proposal, the collector is supported on one or more springs which deflect under the weight of the load. This proposal utilizes a normally OFF momentary contact switch, which contacts close under a predetermined load, and which serve to cut-off the ignition system of the mower.

In accordance with other proposals, optical or sound transducers or electrical resistance sensors are used which change the state of a switch responsive to blockage at the outlet of the chute, and the changed output is indicated either by the operation of an alarm or by changing the operation of the lawnmower, for example.

One of the problems encountered with the above proposals is that of transient conditions which trigger spurious signals. This problem was recognized in at least one of the prior art proposals wherein an electronic delay circuit was incorporated to overcome the problem. However, this delay circuit necessitated a delay reset circuit, to overcome the problem of accumulated delays. Other problems are related to the widely differing responses that may be encountered under different conditions such as wetness and length of grass cuttings, and the tendency of the grass cuttings to mat onto all surfaces with which they come into contact and to thereby change the operating characteristics of the transducing elements and eventually to render them inoperative unless carefully and frequently cleaned.

It is an object of this invention to provide in a lawnmowing apparatus a simple and robust detection means that is responsive to the state of fullness of the grass collector.

It is another object of this invention to provide in such apparatus detection means that has a relatively delayed response time whereby it is inherently less likely to be affected by transient conditions.

It is yet another object of this invention to provide in such apparatus, detector means which is disposed in a position in which it is relatively shielded and unaffected by grass cutting build-up and contamination.

It is still another object of this invention to provide in such apparatus, detector means is integrated into the operating system of the mower.

SUMMARY OF THE INVENTION

In accordance with one aspect of the invention, in a lawnmower including a cutting chamber, an air flow passage through which said grass cuttings are discharged in a current of air and a collector for accumulating the cuttings; a detector is provided which is responsive to an air pressure condition within the air flow passage. The detector includes a pressure actuated switch, the condition of which changes under a predetermined pressure condition related to the fullness of the collector; and means is operatively connected to the switch for signalling the condition of fullness.

Suitably and preferably, the pressure condition is the static pressure within the air flow passage. In accordance with Bernouilli's theorem, and ignoring frictional losses in a ducted flow system, the sum of the dynamic (flow) pressure and the static pressure is a constant. When the grass collector is in its empty condition, the dynamic flow through the air flow passage will be at a maximum and correspondingly, the static pressure will be at a minimum. When the grass collector is in its full condition, the dynamic flow throughout the air flow passage will be at a minimum and correspondingly, the static pressure will be at a maximum.

As is well known in relation to air flow measurement within a ducted air flow system, the static pressure in the system is suitably sensed at a small opening in the wall of the duct in a zone of restricted turbulence. In the instant system, the sensing zone is shielded by a baffle. The baffle acts to provide a local restriction of the cross sectional area of the air flow passage, and thereby increase the dynamic pressure at the shielded zone, in accordance with Bernouilli's theorem. Correspondingly, the baffle acts to decrease the static pressure in the shielded zone, for a given air flow through the system. Accordingly, the baffle serves to increase the difference in static pressure measured within the zone between any two given conditions of fullness of the grass collector, and thereby facilitate the detection of a predetermined condition of fullness.

The baffle additionally serves as a shield to protect the static pressure inlet opening from grass cuttings within the air flow passage so as to provide a stable response over extended periods of time, and to reduce the effects of turbulence within the sensing zone created by grass cuttings transported by air flowing within the air flow passage.

Generally speaking, the air flow passage will include an outlet opening from the cutting chamber, and a chute connecting the outlet opening to a grass collector. Suitably and preferably, the sensing zone will be disposed intermediate the inlet and the outlet ends of the chute.

In accordance with one embodiment, the pressure actuated switch can be disposed at some distance from the sensing zone and connected to the static pressure sensing opening by tubing having a small flow resistance, whereby the switch is relatively unaffected by short term transient static pressure variations within the zone that might otherwise cause the pressure actuated switch to change its state prematurely.

In accordance with another embodiment, the pressure sensing opening is relatively large and covered by a stiff vane which is sluggishly movable against a biasing force between a first position in which it generally seals the opening and a second position in which the opening is unsealed, to permit the escape of air therethrough and movement of the vane serves to operate a microswitch to detect the condition of fullness of the grass collector. Since the static pressure within the zone may be negative when the grass collector is up to about 80% filled, a small volume of air may be drawn into the chute through the sensing opening, serving at least in part to flush grass cuttings that may have accumulated at the sensing zone. Suitably, the biasing force that urges the vane towards its closed position may be provided in part by the weight of the vane, and in part by a spring bias provided by the microswitch or by supplemental spring means, for example.

The change of state of the pressure actuated switch may be used in any convenient manner to signify that a predetermined condition of fullness of the grass collector has been reached, for example by providing a visual or audible signal. Alternatively, or in addition, the change in state of the switch may also be used to control an operational function of the lawnmower. In accordance with the preferred embodiment, the cutting blade of the lawnmower is coupled to a prime mover by means of an electromagnetic clutch, and the change of state of the switch de-activates the clutch to uncouple the cutting blade. Suitably and preferably, the pressure actuated switch is part of a switch array that can be set by an operator in accordance with the function to be carried out by the lawnmower, as is described in exemplary manner in relation to the preferred embodiment.

The foregoing objects and aspects of the invention, together with other objects, aspects and advantages thereof will be more apparent from a consideration of the following description of the preferred embodiment thereof taken in conjunction with the drawings annexed hereto.

BRIEF DESCRIPTION OF THE DRAWINGS

FIG. 2 shows a first embodiment, the detector of FIG. 1 in greater detail in axial cross-section;

FIG. 3 shows the detector of FIG. 2 in plan view;

FIG. 5 is a schematic view of an alternative embodiment of the detector.

DESCRIPTION OF THE PREFERRED EMBODIMENT

Figure 1:
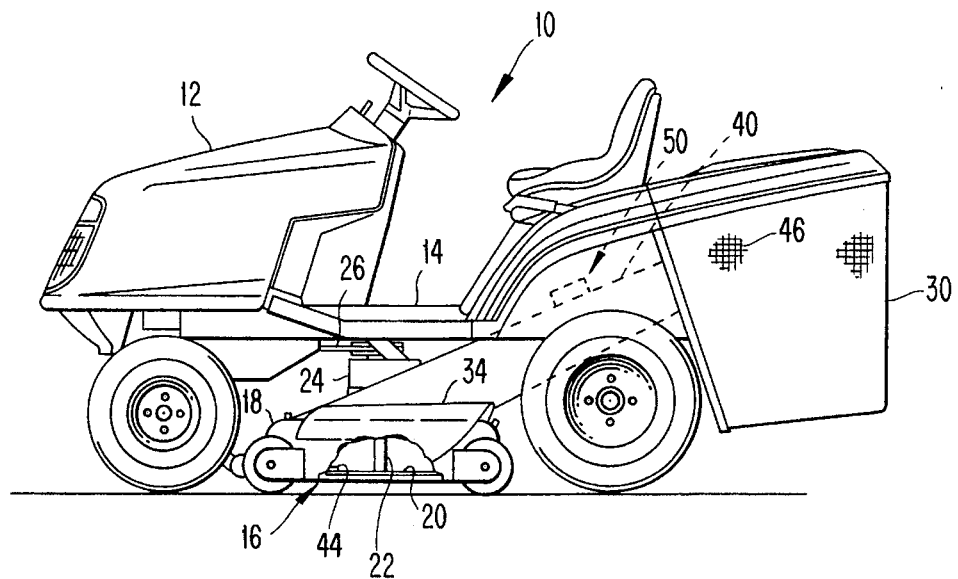
FIG. 1 shows a lawnmowing tractor in side elevation, partially broken away to reveal detail, with other hidden detail shown in dotted outline, incorporating a grass collector fullness detector in accordance with the invention.

In accordance with the invention, a mower 10 includes a tractor 12 having a chassis 14 and a mowing head 16 disposed beneath the chassis. Mowing head 16 includes a cutting chamber 18 with a cutting blade 20 therein mounted for rotation about a vertical shaft 22, which in its turn is coupled through an electromagnetic clutch 24 to the drive of tractor 12 by means of belt 26 or any other convenient means.

A grass collector bin 30 is disposed at the rear of tractor 12. An air passage 32 comprising an outlet 34 in cutting chamber 18 and a chute 40 connects between cutting chamber 18 and the collector bin. Cutting blade 20 has wings 44 upstanding thereon to generate a current of air which serve to impel grass cuttings through air passage 32 for collection in collector bin 30, the walls 46 of the latter being constructed of a foraminaceous material which permits the egress of air from the bin while retaining the cuttings within the bin. Typically, the velocity of the air within the chute 40 will be in the range of about 25 m/s to about 100 m/s. As thus far described, mower 10 is of a more or less conventional nature.

In accordance with the invention, a means 50 is provided for detecting the state of fullness of collector bin 30. Means 50 includes a small baffle 52 which depends downwardly from the wall 54 of chute 40 over a portion of the periphery thereof to define an area of locally reduced cross-section within the chute, and a zone 56 within that area which is physically shielded from grass cuttings by the baffle. The physical shielding is enhanced by a protective mesh or screen filter 58. An opening 60 is provided in wall 54 in shielded zone 56. A vane 62 is supported from chute wall 54 on the exterior of chute 40 by a hinge 64. A wall 66 surrounds opening 60 and vane 62. Vane 62 pivots on hinge 64 between a first position in which it substantially closes opening 60 and a second position wherein air may escape freely from chute 40, with wall 66 acting to reduce the free escape of air through opening 60 until such time as vane 62 is proximate its second position, shown in dashed outline in FIG. 2.

Means 50 further includes a normally closed momentary acting microswitch 70 which is disposed so as to be actuated by vane 62 to an open position when the vane is at its second position. Microswitch 70 will typically be biased by an internal spring means 70-S to its normally closed position, which biasing force is conveniently used to supplement the weight of vane 64 to bias the vane to its closed position.

Considering now the operation of detector means 50, as grass collector bin 30 fills, the resistance to the escape of air from the bin will increase and the static pressure sensed at pressure sensing opening 60 will increase to a maximum indicative of the complete fullness of the bin. Pressure actuated microswitch 70 may be set to change its state responsive to any desired condition of fullness of collector bin 30, but for most purposes, it will be preferred that this occurs when the bin is filled to or close to its maximum capacity. Under this condition, the rate of change of static pressure will tend to be a maximum, and the system will be less likely to be affected by variations in the cutting length and moisture content of the grass cuttings. Typically, the sensed static pressure at sensing opening 60 may be slightly negative, creating a small flow of air into chute 40 through the sensing opening which will assist in cleaning filter 58, until such time as the grass collector bin 30 is about 80% full, and will commence to increase very rapidly when the collector bin is filled to about 95% capacity, typically attaining a pressure of about 200 Pa when the bin is full.

Tractor 12 includes a battery "B" or other convenient source of electromotive power for the operation of an electric clutch 24. Conductor 72 connects one electrical side of battery B through ground and through a safety seat switch 85 to one electrical side of the clutch 24. The opposed side of the clutch is connected to the opposed side of the battery B by a conductor 74 through a safety switch 80 and a switch array 76. The safety switch 80 is activated by collector bin 30 in such a way as to close the electrical path between switch array 76 and clutch 24 when the empty bin 30 is positioned properly on tractor 12. Switch array 76 comprises master switch 78, selector switch 86, microswitch 70, electrically operated relay 92, and reset switch 90. The master switch 78 can be toggled ON or OFF to enable or disable clutch 24. Selector switch 86 can be toggled between manual or automatic positions. When the switch 86 is set to its manual position, the fullness detector feature is disabled and the operation of clutch 24 is controlled by the operation of master switch 78, assuming that the contacts of safety switches 80 and 85 are closed.

Figure 4:
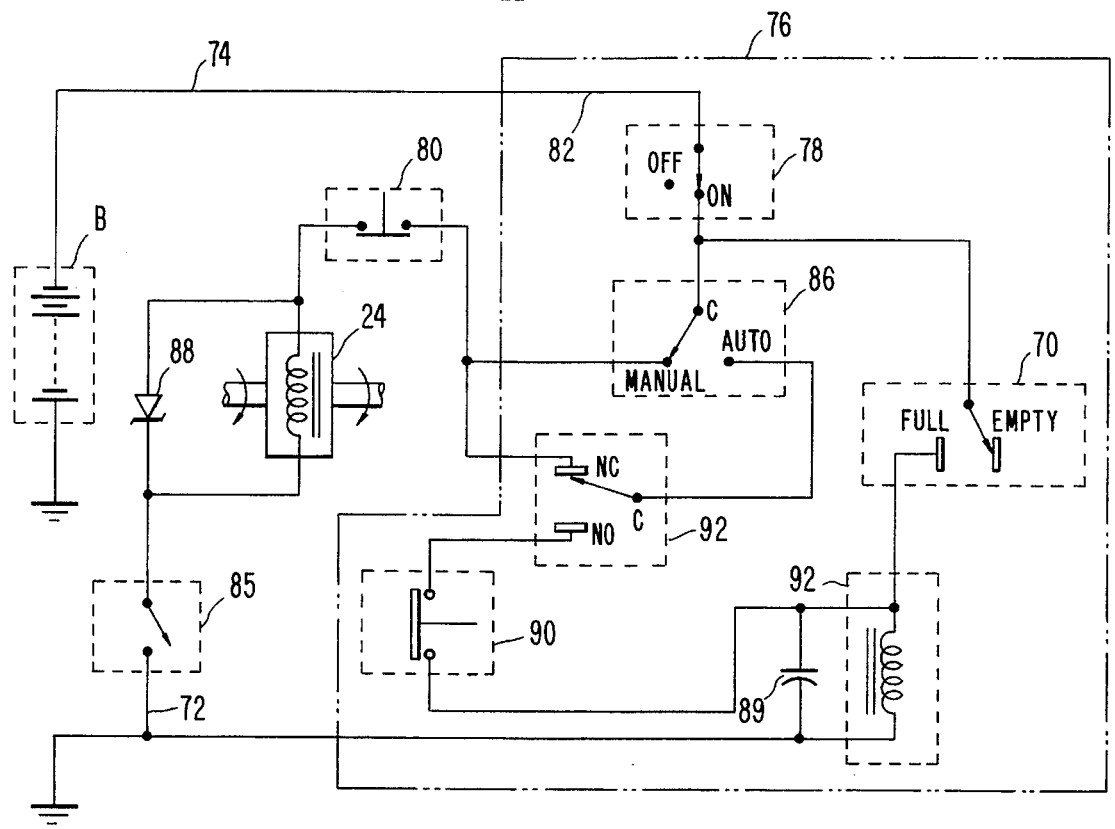
FIG. 4 is an electrical schematic of the operating system of the tractor of FIG. 1 incorporating the detector.

In the instance when the selector switch 86 is set to its "AUTO" position, when the collector bin 30 is not full, the contacts of microswitch 70 will be in their open or OFF condition, as shown in FIG. 4, and electrical power to the clutch 24 will be supplied through NC {normally closed} pair of contacts of relay 92. As the collector bin 30 fills up, microswitch 70 will eventually be activated by the increase of pressure as described earlier, resulting in electrical power being supplied to the coil of the relay 92, causing its NO {normally open} set of contacts to close. This action simultaneously disables the clutch 24 and provides alternate supply of electrical power through reset switch 90 to latch relay 92 ON. Consequently, cutting blades 20 stop rotating, the static pressure within the cutting system drops, and microswitch 70 returns to its open position. Electrical relay 92 will remain latched on and clutch 24 disabled until such time as reset switch 90 is momentarily opened, interrupting power supply to the relay 92. As a result, the contacts of relay 92 return to their normally open position, restoring electrical power supply to the clutch and ultimately the cutting action.

In the circuit of FIG. 4, capacitor 89 improves the stability of the system, and zener diode 88 serves to prevent excessive voltage build up due to the inductive nature of clutch 24.

Referring now to FIG. 5, an alternative form of a detector means in accordance with the invention is identified by the numeral 150. Detector means 150 includes a baffle 152 disposed on the interior of chute wall 154 to create a zone 156 in a similar arrangement to the comparable parts of detector 50. Detector means 150 further includes a sealed diaphragm differential pressure actuated switch 170 of a type which is well known in the art, and which comprises two chambers A and B separated by a diaphragm, the movement of which under a predetermined pressure differential between the chambers causes a change of state of the switch, which is the electrical equivalent of microswitch 70. One of the chambers, here shown as chamber A, is connected to a small opening 160 in the chute wall at zone 156, by tubing 161, which may have a damping effect to prevent the switching of switch 170 under transient conditions, while the other of the chambers is open to the atmosphere. The second embodiment differs from the first embodiment in that there is no escape of air through opening 160. The operating system of tractor 12 will be unchanged whichever of the detectors 50 or 150 is employed.

It will be apparent that many changes may be made to the illustrative embodiment while falling within the scope of the invention, and it is intended that all such changes be covered by the claims appended hereto.

I claim:

1. A lawnmower including a cutting chamber and a motor-driven rotary cutter blade therein;

an air flow passage through which grass cuttings are discharged from said cutting chamber in a current of air;

a collector connected to said air flow passage for accumulating said grass cuttings;

a detector including a pressure actuated switch responsive to an air pressure condition within said air flow passage to change the state of said pressure actuated switch under a predetermined pressure condition related to the fullness of said collector; and a blade control mechanism operatively connected to said pressure actuated switch and responsive to the change in state thereof to effectively deactivate said blade.

2. A lawnmower as defined in claim 1 wherein said pressure condition is the static pressure within said air flow passage.

3. A lawnmower as defined in claim 2 including a baffle disposed in said air flow passage which acts to provide a local restriction of the cross-sectional area of said passage, and thereby create a zone therein wherein the static pressure is reduced for a given air flow through said passage.

4. A lawnmower as defined in claim 3 wherein said air flow passage comprises an outlet to said cutting chamber and a chute extending between said outlet and said collector, and wherein said baffle is disposed within said chute.

5. A lawnmower as defined in claim 4 wherein said baffle acts to reduce the static pressure within said zone to negative values for air flows through said chute when said collector is empty.

6. A lawnmower as defined in claim 1 wherein said blade control mechanism includes an electromagnetic clutch which when enabled connects the cutting blade disposed in said cutting chamber to a source of power, and circuit means which disables said clutch upon detection of a predetermined collector fullness condition.

7. A lawnmower as defined in claim 6 wherein said circuit means includes a latching means to retain said clutch in a disabled condition, and manually operable switch means for manually re-setting said latching means.

8. A lawnmower as defined in claim 1 wherein said pressure actuated switch is a normally ON, momentary OFF, diaphragm switch.

9. A lawnmower as defined in claim 3 wherein said air flow passage is defined by wall means, and wherein said wall means is provided in said zone with an opening therethrough;

said pressure actuated comprises a vane movable between a first position closing said opening and a second position to permit air flow outwardly through said opening;

means biasing said vane to said first position;

and a microswitch operable by movement of said vane between said first position and second position.

10. A lawnmower as defined in claim 9 wherein said opening is provided with a wall surrounding at least a portion of the periphery of said opening.

11. A lawnmower as defined in claim 10 wherein said wall completely surrounds said periphery.

12. A lawnmower as defined in claim 9 wherein said microswitch biases said vane towards said first position.

13. A lawnmower as defined in claim 9 wherein said vane is mounted for pivotal movement between said first and second positions.

14. A lawnmower as defined in claim 3 wherein screening means is associated with said baffle to reduce the build-up of grass cuttings within said zone.

15. A lawnmower including a cutting chamber;

an air flow passage through which grass cuttings are discharged from said cutting chamber in a current of air;

a collector connected to said air flow passage for accumulating said grass cuttings;

a detector including a pressure actuated switch responsive to an air pressure condition within said air flow passage to change the state of said pressure actuated switch under a predetermined pressure condition related to the fullness of said collector;

means operatively connected to said pressure actuated switch and responsive to the change in state thereof to signal said condition of fullness;

a baffle disposed in said air flow passage which acts to provide a local restriction of the cross-sectional area of said passage, and thereby create a zone therein wherein the static pressure is reduced for a given air flow through said passage, said passage defined by wall means, and wherein said wall means is provided in said zone with an opening therethrough;

said pressure actuated switch comprising a vane movable between a first position closing said opening and a second position to permit air flow outwardly through said opening;

means biasing said vane to said first position; and a microswitch operable by movement of said vane between said first position and second position.

16. A lawnmower including a cutting chamber;

an air flow passage through which grass cuttings are discharged from said cutting chamber in a current of air;

a collector connected to said air flow passage for accumulating said grass cuttings;

a detector including a pressure actuated switch responsive to an air pressure condition within said air flow passage to change the state of said pressure actuated switch under a predetermined pressure condition related to the fullness of said collector;

means operatively connected to said pressure actuated switch and responsive to the change in state thereof to signal said condition of fullness;

a baffle disposed in said air flow passage which acts to provide a local restriction of the cross-sectional area of said passage, and thereby create a zone therein wherein the static pressure is reduced for a given air flow through said passage; and screening means associated with said baffle to reduce the build-up of grass cuttings within said zone.

* * * * *